United States Patent
Gupta

(10) Patent No.: US 11,531,979 B2
(45) Date of Patent: **\*Dec. 20, 2022**

(54) STORED-VALUE CARD-TO-CARD DIRECT COMMUNICATION

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 166 days.

This patent is subject to a terminal disclaimer.

(21) Appl. No.: 16/827,908

(22) Filed: Mar. 24, 2020

(65) Prior Publication Data

US 2021/0304189 A1   Sep. 30, 2021

(51) Int. Cl.
| | |
|---|---|
| *G06Q 20/34* | (2012.01) |
| *G06Q 20/40* | (2012.01) |
| *G06Q 20/22* | (2012.01) |
| *H04W 4/80* | (2018.01) |
| *G06K 19/07* | (2006.01) |
| *H04B 5/00* | (2006.01) |

(52) U.S. Cl.
CPC ....... *G06Q 20/352* (2013.01); *G06K 19/0707* (2013.01); *G06Q 20/223* (2013.01); *G06Q 20/409* (2013.01); *G06Q 20/4012* (2013.01); *H04B 5/0031* (2013.01); *H04W 4/80* (2018.02)

(58) Field of Classification Search
CPC ............... G06Q 20/352; G06Q 20/223; G06Q 20/4012; G06Q 20/409; H04W 4/80; G06K 19/0707; H04B 5/0033

USPC .......................................................... 705/41
See application file for complete search history.

(56) References Cited

U.S. PATENT DOCUMENTS

| | | | |
|---|---|---|---|
| 2011/0140841 A1* | 6/2011 | Bona ................ | G06K 19/06196 340/5.83 |
| 2013/0214042 A1* | 8/2013 | Kingston ........... | G06Q 20/4012 235/379 |

(Continued)

OTHER PUBLICATIONS

"Swing-Pay: One Card Meets All User Payment and Identity Needs," by Shirsha Ghosh; Joyeeta Goswami; Alak Majumder; Abhishek Kumar; Saraju P. Mohanty; and Bidyut K. Bhattacharyya. IEEE Consumer Electronics Magazine: Jan. 2017. Published: Dec. 14, 2016. (Year: 2016).*

*Primary Examiner* — Sara C Hamilton
(74) *Attorney, Agent, or Firm* — Weiss & Arons LLP

(57) ABSTRACT

A method for performing a card-to-card direct contactless transaction between a first active stored-value smart card ("SVSC") and a second active SVSC, each comprising an active near-field communication ("NFC") reader. The method may include activating the first active SVSC by receiving input of a personal identification number ("PIN") on a keypad located on the first active SVSC, verifying the PIN and further receiving input of a transaction amount on the keypad. The method may further include initiating a wireless NFC communication to perform the transaction by positioning the first active SVSC within a pre-determined distance to the second active SVSC and confirming accuracy of each of the first and second active SVSC using the active NFC reader to retrieve card ID data and confirm accuracy. Following confirming, the method may include directly completing the transaction between the first active SVSC and the second active SVSC.

10 Claims, 6 Drawing Sheets

(56) References Cited

U.S. PATENT DOCUMENTS

2017/0289127 A1* 10/2017 Hendrick ............ H04W 12/065
2019/0043039 A1* 2/2019 Wilson ............... G06Q 20/3278
2019/0286805 A1 9/2019 Law et al.
2021/0390590 A1* 12/2021 Braun ................. G06Q 20/352

* cited by examiner

STORED-VALUE CARD-TO-CARD DIRECT COMMUNICATION

FIELD OF TECHNOLOGY

Aspects of the disclosure relate to a smart card with enhanced communication features.

BACKGROUND OF THE DISCLOSURE

Cards that are used for performing transactions including financial transactions, purchasing products, gift cards, mass transit and personal identification, may include, embedded in the card, multiple methods of performing the transactions. These cards include, but are not limited to, one or more of a magnetic stripe that can be swiped at a card reader device, a Europay, Mastercard and Visa ("EMV") chip to be inserted into a device and a near-field communication ("NFC") chip for a contactless transaction.

NFC is a rapidly growing, short-range and wireless technology. Cards that include an NFC chip are enabled to passively transfer information stored on an NFC tag within the card to an NFC-enabled device, i.e.—smartphone, point-of-sale device. These cards typically do not include a battery. The cards are powered by a signal received from an active NFC-enabled device when the two are in near proximity. The signal provides sufficient power to the card to enable the card to passively transmit the information to the active NFC-enabled device. The active NFC enabled device can then retrieve the passively transferred information.

Stored-value ("SV") cards are a type of card used in performing transactions. SV cards are cards that may be pre-paid. SV cards may be pre-loaded with a monetary value. The SV card may be vendor-specific. The SV card may be issued by a credit card issuer and may then be used for performing transactions in numerous stores and locations not specific to the vendor. The SV card may be also used in transit system fare-cards, telephone prepaid calling cards, cafeterias and vending machines.

These cards may be labeled as 'smart' cards. Conventional smart cards rely upon other devices to make a transaction. However, when an individual needs to make a payment to another individual, the POS device or other suitable device is typically required for completing the transaction.

Since stored-value smart cards ("SVSC") are pre-paid cards, the monetary value may be stored directly on the card. When an individual wants to submit funds to a second individual, it may be advantageous to utilize the SVSC to transfer funds from one SVSC to another SVSC.

Therefore, it would be desirable to enable one SVSC to directly communicate with the second SVSC. It would further be desirable to enable the pair of SVSC's to communicate with one another and complete the transaction between the two.

SUMMARY OF THE DISCLOSURE

Aspects of the disclosure relate to systems and methods for performing a card-to-card direct contactless transaction between a first active stored-value smart card ("SVSC") and a second active SVSC. The first active SVSC may be an initiator of the transaction. The second active SVSC may be a target of the transaction. The target of the transaction may be the recipient of the transaction.

The method may include activating the first active SVSC to perform a secure transaction with the second active SVSC. The activating may include receiving input of a personal identification number ("PIN") on a keypad located on the first active SVSC. The activating may also include verifying the PIN being associated with the first active SVSC. The verifying may be prior to activating the first active SVSC. The verifying may be enabled by using a microprocessor embedded in the first active SVSC.

In response to the activating, the method may include receiving input of a transaction amount on the keypad. The method may also include storing the transaction amount on the first active SVSC.

The method may further include initiating a wireless NFC communication between the first active SVSC and the second active SVSC. Each of the first active SVSC and the second active SVSC may include an active NFC reader. The active NFC reader may be enabled to be active by using a battery embedded in each of the first and second active SVSC.

The initiating may include positioning the first active SVSC within a pre-determined distance to the second active SVSC. Exemplary NFC communication ranges may be 0-1 inches, 0-1.5 inches, 0-2 inches, 0-2.5 inches, 0-3 inches, 0-3.5 inches, 0-4 inches, 0-4.5 inches, 0-5 inches, or any other suitable range supported by NFC apparatus.

Following the activating of the wireless NFC communication, the method may include verifying that the first originator is the second originator. The verifying may be performed by the microprocessor on the first active SVSC. The originator of the SVSC may be an entity that issued the card. If the first originator is not the same as the second originator, the method may include terminating the wireless NFC communication between the two active SVSCs.

When the first originator is the second originator, the method may further include ensuring a security of the wireless NFC communication between the first active SVSC and the second active SVSC. The ensuring of the security may be enabled by the first active SVSC confirming the card ID data associated with the second active SVSC and the second active SVSC confirming the card ID data associated with the first active SVSC. The data may be retrieved from an NFC tag embedded in each of the first and second active SVSC. The card ID data may include non-sensitive identification data associated with a cardholder of the card and the card itself.

The confirming may include retrieving card ID data associated with the second active SVSC. The retrieving may be enabled using the active NFC reader associated with the first active SVSC. Following the retrieving, the method may include acknowledging and confirming the card ID data associated with the second active SVSC. The acknowledging and confirming may be enabled using a microprocessor embedded in the first active SVSC.

In certain embodiments, for the first active SVSC, the acknowledging and confirming may include comparing the card ID data of the second active SVSC to a list of card ID data stored on the first active SVSC and then verifying that the card ID data is included in the stored list. The stored list may be a pre-determined list of recipients. It should be appreciated that the stored list may be altered and updated in real-time. In the event that the card ID data is not included in the stored list, the method may include terminating the wireless communication between the first and second active SVSCs.

For the first active smart card, the acknowledging and confirming further may include a manual authentication. The manual authentication may include displaying a name of a cardholder associated with the second active SVSC on the display of the first active SVSC. Using the keypad, a cardholder of the first active SVSC may authenticate the second active SVSC.

The second active SVSC may then retrieve card ID data associated with the first active SVSC using the active NFC reader associated with the second active SVSC. Following the retrieving, the method may include acknowledging and confirming the card ID data associated with the first active SVSC. The acknowledging and confirming may be enabled using a microprocessor embedded in the second active SVSC. The second active SVSC may also confirm the transaction amount.

In certain embodiments, for the second active SVSC, the acknowledging and confirming may include comparing the card ID data associated with the first active SVSC to a list of card ID data stored on the second active SVSC and then verifying that the card ID data is included in the stored list. In the event that the card ID data is not included in the stored list, the method may include terminating the wireless communication between the first and second active SVSCs.

For the second active smart card, the acknowledging and confirming may include displaying non-sensitive identification data of a cardholder associated with the first active SVSC on the display of the second active SVSC. Using the keypad, the method may include receiving authentication by the cardholder of the second active SVSC.

In response to the acknowledging, the method may include completing the transaction between the first active SVSC and the second active SVSC. The completing of the transaction may be implemented by reducing, by the transaction amount, a value stored on the first active SVSC and then increasing, by the transaction amount, a value stored on the second active SVSC. The increasing of the value may be applied less the amount of a transaction fee associated with the transaction between the first and second active SVSC.

The value stored on each of the cards may be a monetary value associated with the SVSC.

Following the completion of the transaction, the method may also include receiving a confirmation from the first active SVSC of the completion of the transaction.

The method may also include transmitting the confirmation from the microprocessor to a display on the keyboard, via a display connector and further displaying, on the display, a message confirming a completion of the transaction.

In certain embodiments, the first and second active SVSC may include a light embedded in the card. The light may be in the form of a light-emitting diode ("LED"). The light may preferably not alter the size of a standard card size. The light may be powered by the battery included in each of the first and second active SVSC. When the wireless communication is initiated, the light may emit a red color indicating that a transaction may be in progress. When the transaction is complete, the light may emit the color green. This may indicate a completion of the transaction.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
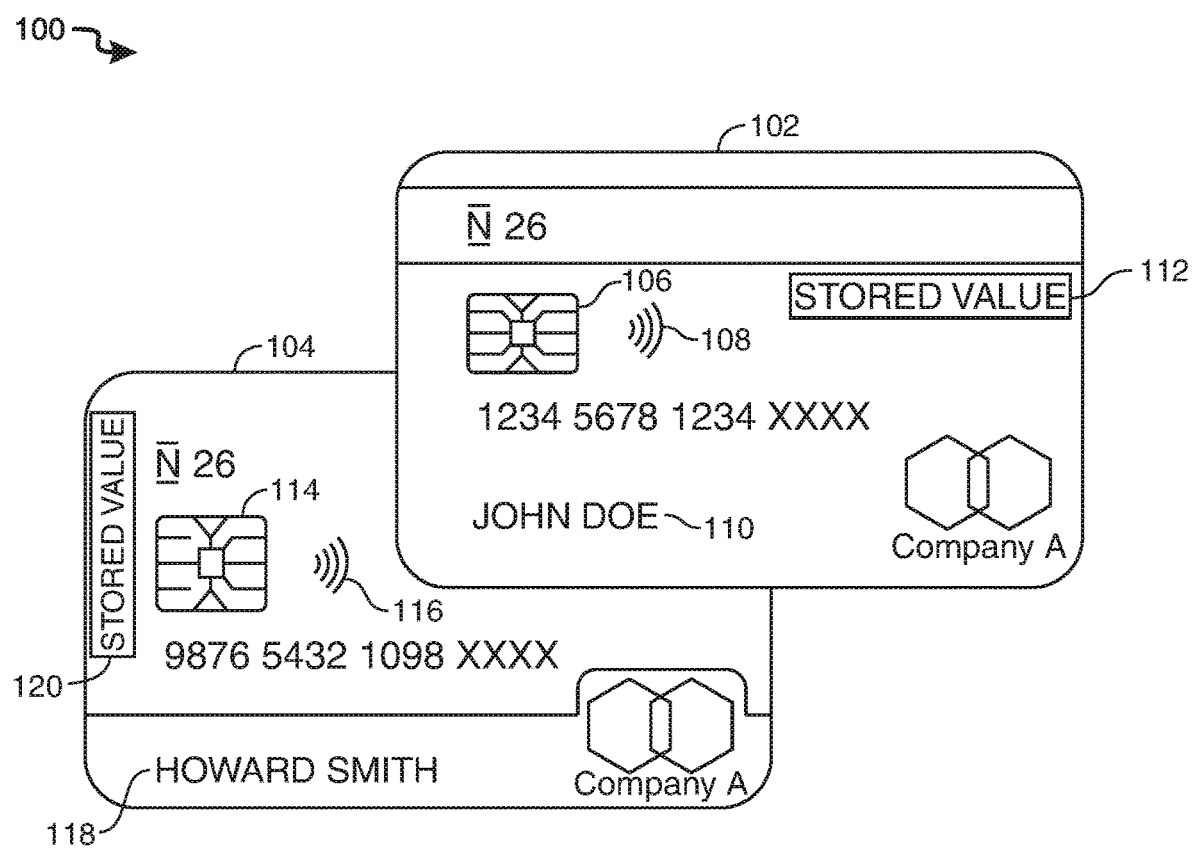
FIG. 1 shows an illustrative diagram in accordance with principles of the disclosure.

A smart card contactless payment system is provided. The system may enable one active stored-value smart card ("SVSC") to directly communicate with a second SVSC. The first and second SVSC may be active cards. The active cards may be enabled via an active NFC reader embedded in each of the cards.

Smart cards, for purposes of the disclosure, may include one or more types of payment instruments. The payment instrument may include, but may not be limited to, a credit card, debit card, ATM card, phone payment card, stored-value card and gift card.

An active SVSC may differ from a credit or debit card. An SVSC may store a monetary value directly on the card itself and may not be connected to any bank payment network. The funds may be withdrawn and deposited directly to the card itself. The funds and any other data may be physically stored on the card. The monetary value may be accessed using mechanisms used on smart cards including but not limited to magnetic stripe, EMV and NFC.

The SVSC may be a closed-loop type of stored-value card. In a closed-loop stored-value card the funds and or data may be physically stored on a token embedded in the card or on the card itself. The funds and/or data may be stored as binary-coded data.

The direct communication between the first active SVSC and the second active SVSC may enable a completion of a transaction between the first and second active SVSC. The direct communication may be enabled using near-field communication ("NFC") technology. NFC standards cover communications protocols and data exchange formats. NFC standards are based on existing RFID standards including ISO/IEC 14443 and FeliCa. The standards include ISO/IEC 18092 and those defined by the NFC Forum.

NFC may be a standard for wireless data transition and may adhere to certain specifications in order to be able to communicate properly with each other. Similar to other wireless signals like Bluetooth and Wi-Fi, NFC works by sending information over radio waves. The NFC technology may be based on radio-frequency identification ("RFID") that may use electromagnetic induction in order to be able to transmit information. Bluetooth connections may be enabled to transmit data up to about 10 meters from the source. NFC communications may be enabled to exchange data up to about 4 inches from the source. The connectivity of a first and second device may be a faster connection when using NFC.

NFC may operate at 106 Kbps, 212 Kbps and 424 Kbps. NFC may transmit at a speed of 13.56 megahertz ("Mhz"). NFC data is transmitted in an NFC Data Exchange Format (NDEF), using the Simple NDEF Exchange Protocol (SNEP). SNEP uses a Layer 2 logical Link Control Protocol (LLCP). This may be connection-based to provide reliable data delivery.

Since the radio frequency ("RF") signals in a communication using NFC have a limited distance, hacking may be very difficult. A potential hacker may be required to be within a few meters distance to be able to attempt hacking the device.

There may be two classifications of NFC devices. A first classification of NFC devices may be passive NFC devices. A second classification of NFC devices may be active NFC devices. Smart cards in connection with a POS terminal, store products, and interactive signs may all be passive NFC devices. Interactive signs and advertisements may also be passive NFC devices. Passive NFC devices may include an NFC tag that stores data but does not have power. These tags are powered when in contact with an active NFC device.

A point-of-sale ("POS") device may be the active NFC device. POS devices may include POS devices at touch payment terminals, card readers at public transport locations, smartphones, ipads, tablets and any other mobile device.

Passive NFC devices may not be able to process any information that may be sent from other sources. Passive NFC devices may also not be able to connect to other passive NFC devices.

These passive NFC devices may include an NFC tag which may enable an active NFC enabled device, when in close proximity, to extract the data stored on the NFC tag using radio waves. They may not include a power source such as a battery and may only gain power when an active NFC device comes in close range to the tag using electromagnetic induction. This mode may be an NFC read-write mode. The read-write mode may enable the active device to read information from the passive device. The read-write mode may be a one-way communication.

For example, when an individual desires more details of a product located in a store, the individual may position his personal mobile device in close range to the NFC tag. The mobile device may be an active NFC device and when the mobile device is within close range, the NFC tag may be powered by an electromagnetic field produced by the mobile device.

Additionally, when a smart card is within range of a POS device to perform a transaction, the smart card is powered and may release data to the POS device. After receiving the data release, the POS device may complete the transaction.

Aspects of the invention may include embodiments of both a first and second active SVSC. Both the first and second active SVSC may be active NFC devices. Each of the first and second active SVSC may include an active near field communication ("NFC") reader. The active NFC reader may enable a direct communication between the first active SVSC and the second active SVSC. When the first active smart card is in proximity to the second active smart card, the two smart cards may be directly enabled to exchange data and perform transactions. The direct communication may be independent of a POS device.

The card-to-card direct payment system may preferably preclude the need for an additional smart mobile device involved in a transaction between the two devices. Accordingly, this eliminates the extra step of swiping the card at the POS terminal. Additionally, by enabling a direct communication from one smart card to another smart card, the chance of potential attacks and threats may be mitigated, at least because of the close proximity that may be necessary in order to copy sensitive data. The smart card may only need to communicate with the second active smart card and the payment network. The smart cards may include a hard-wired security system with multiple layers of encryption and may only have access to the payment network. When communicating with a mobile device and/or any other form of a POS device and/or ATM, the level of security of the smart cards may be reduced since mobile devices and other POS devices may be connected and linked to many other network connections and online applications.

It should be appreciated that a contactless transaction between the first and second active smart card may be performed when the proximity of the two smart cards may be equal to or less than a distance of four inches. This may be within approximately a 10 centimeter ("cm") range.

In certain embodiments, the first active SVSC may be an initiator of a transaction. The second active SVSC may be a recipient of the transaction. Each of the first and second active SVSCs may be a payment instrument. Each of the first and second active SVSCs may include NFC to enable a contactless communication.

In this embodiment, SVSCs may be active NFC devices. The SVSC may include an active NFC reader. The SVSC may be enabled to perform a direct transaction with another SVSC when within a maximum range of 4 inches.

The SVSC may also include a keypad configured to receive input of a transaction amount, PIN and account number. The SVSC may also include a microprocessor. The microprocessor may enable communication between the SVSC and a payment network. The payment network may establish the connection to the necessary banks to complete the transaction.

The SVSC may also include a battery. Since the SVSC, in certain embodiments, may be an active NFC device, the card may need power to send and receive data.

SVSCs that may include active NFC may be enabled to send and receive money from one active NFC enabled SVSC to another active NFC enabled SVSC. For example, a cardholder of an SVSC may wish to give money to another individual. The money may be a gift, loan and/or a payment. If the individual has an active NFC enabled SVSC, the two SVSCs may position the cards within 4 inches of one another or any other suitable range supported by NFC apparatus, and complete the transaction.

The process may include the cardholder of the first SVSC to activate and verify that he is the cardholder by inputting a personal PIN number, via the keypad, on the SVSC. The SVSC may authenticate the cardholder. The cardholder may then input a transaction amount, submit the amount, via the keypad and the data may be transmitted to the second SVSC. In this example, since all the monetary value is directly stored on the SVSC, the SVSC may not need to access the payment network. The transaction may be completed directly between the two cards. The monetary value may be adjustable and rewritable directly on the card itself.

It should be appreciated that in certain embodiments the communication and execution of a transaction may be vendor-specific. The first SVSC and the second SVSC may be configured to communicate when issued by the same vendor. This may be detected by implementing an encryption scheme between the two SVSCs. The cards may not be enabled to communicate and/or share data and exchange monetary value under certain circumstances. In one circumstance this may occur when the cards do not originate from the same payment network. In another circumstance this may occur when the cards do not originate from the same vendor.

Since the active NFC enabled SVSC includes an embedded keypad, it may also be implemented for transmitting a monetary value to a bank account and submit payment for a purchase when the SVSC is not within close proximity to a POS device. In this embodiment, the SVSC may need to use the NIC to establish a WI-FI connection in order to be able to communicate with a payment network. In this embodiment the SVSC may be a cash card and may not be vendor based.

Both the first and second active SVSC may also include an NFC tag. The NFC tag may include an antenna. The NFC tag may be for storing data associated with the smart card and can further store data associated with a transaction. The NFC tag may be a re-writable tag. The NFC tag may also enable each of the first and second active SVSC to perform as passive NFC devices when preferred.

When both the first and second active SVSC are active NFC devices they may communicate in an active peer-to-peer ("P2P") mode. The active P2P mode may be a two-way communication. The active P2P mode of communication may enable utilizing the first active smart card as a passive NFC device when transferring card ID data and the second active smart card as an active NFC device when retrieving and processing the card ID data. Both the devices may generate the radio waves alternately and share information and card ID data.

This P2P mode of communication may enable two smart cards to communicate and directly complete a transaction without the need of a POS device.

For example an individual may wish to make a payment to a friend. The individual may want to transfer funds from his smart card and debit it to his friend's card. The funds may be a donation. The funds may be a loan. The funds may be a gift. Because both cards are active NFC-enabled devices, the two smart cards may communicate and execute the transaction.

In accordance with principles of the disclosure, the individual may position his smart card within 4 inches of the recipient's smart card. The close range may enable NFC to activate the cards to perform the transaction. The individual may input an amount of funds into the keypad of his card that he desires to debit to the recipient's card. The two SVSCs may perform a handshake. The handshake may enable each card to acknowledge and authenticate the other card. Once authenticated, the first active SVSC and the second active SVSC may communicate and directly complete the transaction.

Each of the first and second active SVSC may also include a nano wireless network interface card ("NIC"). The nano wireless NIC may be both smaller and approximately 15% thinner than the Micro SIM (3FF) standard as well as the Mini SIM (2FF) cards. The nano wireless NIC may enable establishing a wireless connection to a Wi-Fi device. When the first active smart card is the initiator and the second active smart card is the target, the two cards may exchange information and the initiator may complete the transaction with the target. The communication between the first and second active SVSC may be performed by the microprocessor embedded in the cards.

Both the first and second active smart card may also include a microprocessor. The microprocessor may enable processing, storing and transmitting card ID data.

Both the first and second active smart card may also include a battery. The system may also include a solar pad configured for charging the battery.

It should be appreciated that in embodiments in which both the first and second active smart card are active NFC devices, they may both use a battery when performing in an active mode.

Each of the first and second active SVSC may also include a keypad. The keypad may include a display and numerical keys. The numerical keys may be configured to accept input of a personal identification number and a transaction amount. The keypad may be embedded on the smart card and may not entail changing the size of the standard card size. In accordance with the ID-1 of ISO/IEC 7810 standard, smart card size may be defined as 85.60×53.98×0.76 mm (3.370×2.125×0.030 in).

The keypad may include slightly raised numerical keys and may be responsive to actuation by a touch of a finger. It should be appreciated that the numerical keys may be raised no more than the level of the embossed characters on any smart card. The standard credit card such as a Visa or MasterCard is 0.030" (30 mil) thick in areas of embossment. Most embossed cards are 0.030" or 0.024" thick.

It should be appreciated that the keypad may be deactivated when not in use. In certain embodiments, the keypad may be activated by a touch of any key on the keypad. The keypad may be responsive to actuation by a stylus. In other embodiments, to protect the smart card from being accessed by an outsider and/or from being pressed on unintentionally, the keypad may require input of one or more pre-determined numerical keys in order to activate the keypad.

Additionally, the active NFC reader may also be powered-off. In order to perform a transaction with the first active smart card and a second active smart card, a PIN may be required to be inputted in the first active smart card in order to activate the active NFC reader.

In some embodiments, an active stored-value smart card ("SVSC") may be provided. The active SVSC may include an active near-field communication ("NFC") reader. The active SVSC may also include a battery. The battery may be configured to power the active NFC reader.

The active SVSC may also include an originator associated with the active SVSC. The originator may be an entity that issued the card. For example, American Express ("AMEX")®, VISA® and MasterCard® may be entities that issue SVSCs. Additional entities that may issue cards may be wholesale and retail online and/or brick and mortar vendors.

The active SVSC may also include an NFC re-writable tag. The NFC tag may include card ID data and a value of the SVSC stored on the NFC tag. In some embodiments, the active SVSC may include a nano wireless network interface card ("NIC"). The NIC may enable establishing a wireless connection to a Wi-Fi device when necessary.

The active SVSC may also include a microprocessor enabling processing, storing and transmitting card ID data. The active SVSC may also include a keypad. The keypad may include a display and alpha-numerical keys. The keypad may be configured to receive input associated with a transaction.

The active SVSC may also include a display connector. The display connector may be configured to intermediate between the keypad, the display and the microprocessor.

When the active SVSC is within a pre-determined distance of an additional active SVSC, the active SVSC and the additional active SVSC may be configured to communicate using an active wireless communication.

The additional active SVSC may be a second active SVSC. The second active SVSC may also include an active NFC reader. The second active SVSC may also include a battery configured to power the active NFC reader.

The second active SVSC may include an originator associated with the SVSC. The second active SVSC may also include an NFC re-writable tag comprising card ID data. Additionally a value of the SVSC may be stored in memory. The value of the SVSC may be stored on the NFC tag.

The second active SVSC may also include a microprocessor enabling processing, storing and transmitting card ID data.

The second active SVSC may also include the keypad and a display connector configured to intermediate between the keypad, the display and the microprocessor.

The active SVSC and the additional active SVSC are configured to complete the transaction. The completing of the transaction may be performed by establishing an NFC-enabled wireless communication between the active SVSC and the second active SVSC. Establishing and then activating the wireless communication may also include receiving input of a personal identification number ("PIN") on a keypad located on the active SVSC. Following input of the PIN the activating may also include verifying, using a microprocessor embedded in the first active SVSC, the PIN being associated with the active SVSC.

Following the establishing of the wireless communication, the completing of the transaction may include receiving input of a transaction amount at the keypad on the active SVSC. The completing of the transaction may further include retrieving the transaction amount using the active NFC reader on the second SVSC. The completing may further include reducing, using the microprocessor on the active SVSC, the value of the active SVSC, by the transaction amount; and increasing, using the microprocessor on the second active SVSC, the value of the second active SVSC, by the transaction amount.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 shows an exemplary diagram 100 of two active smart cards in close proximity to each other. The two smart cards may be directly communicating with one another. The first active smart card 102 and the second active smart card 104 may be active NFC enabled devices. This direct communication may be independent of any intermediary device.

The first active smart card 102, in this exemplary diagram 100, may be a stored-value ("SV") card, as shown at 112. Card 102 may include an EMV chip 106 and an NFC symbol 108. Debit card 102 may belong to a user 'John Doe', as shown at 110.

The second active smart card 104, in this exemplary diagram 100, may also be an active SV smart card ("SVSC"), as shown at 120. SVSC 104 may include an EMV chip 114 and an NFC symbol 116. SV card 104 may belong to a user 'Howard Smith,' as shown at 118.

The NFC symbols 108 and 116 both signify that the SVSC can be used in a contactless transaction. It should be appreciated that in this exemplary diagram 100, SVSCs 102 and 104 are both active NFC enabled devices. These active NFC enabled devices may include active NFC readers that may enable the two SVSCs to exchange information and complete a contactless transaction independent of any POS device.

It should further be appreciated that both SVSCs 102 and 104 have the same originator. The originator of each of the cards is 'Company A.' Because they both have the same originator, SVSCs 102 and 104 may be enabled, using active NFC communication, communicate and perform one or more transactions between the two.

Figure 2:
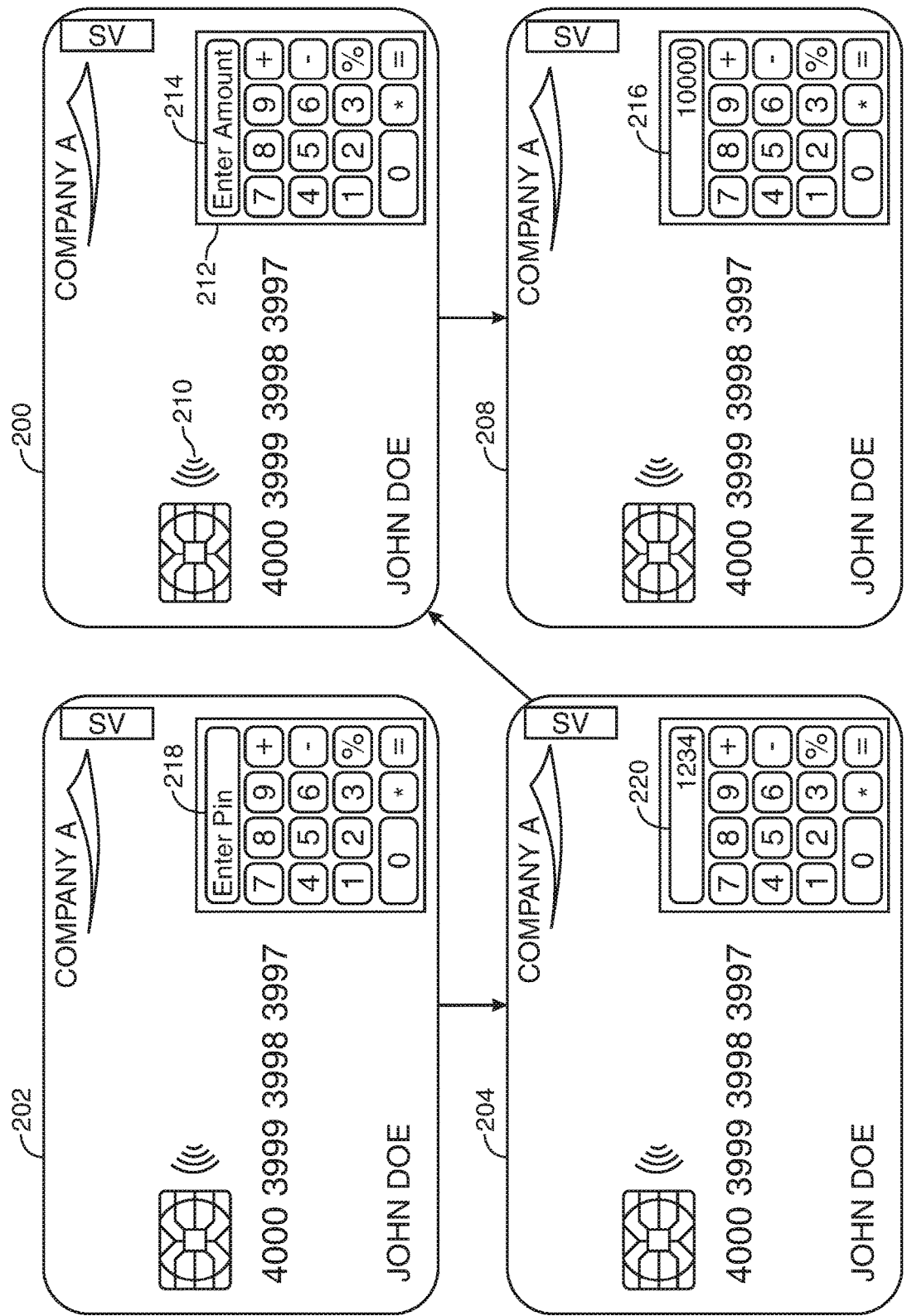
FIG. 2 shows another illustrative diagram in accordance with principles of the disclosure.

FIG. 2 shows an exemplary diagram of an SVSC 200 as an initiator of a transaction. SVSC 200 may initiate a transaction with a second SVSC (not shown). In this exemplary diagram, a cardholder of SVSC 200 may perform a transaction with the second SVSC. The transaction may include transmitting a monetary value from SVSC 200 to the second SVSC.

SVSC 200 displays an NFC symbol at 210 identifying the card to be an NFC enabled card. The NFC hardware embedded in debit card 200 may be hardware that enables the card to operate as an active NFC enabled device.

SVSC 200 may include a number pad 212 configured for receiving input of a transaction amount and a PIN.

SVSCs 202, 204, 206 and 208 may be the same SVSC smart card. Each of SVSCs 202-208 display a step in the process of entering the card ID data and authenticating the debit card prior to performing the transaction.

As shown at 202, prior to attempting to use the SVSC for any form of a transaction, input of a PIN may be required in order to active the card. A user interface may be included on the keypad and may display the text 'enter pin,' as shown at 218.

It should be appreciated that the SVSC 200 may be in a powered-off state when not in use. Prior to any form of a trigger for input of a pin number, the SVSC may require a form of a touch on the card and/or on the keypad in order to be in a powered-on state. A user may press on any number on the keypad in order to turn on the SVSC. In certain embodiments, a user may be required to press a specific number on the keypad in order to turn on the SVSC. This may provide an additional layer of theft prevention to the card and enable the SVSC to be more secure.

At 204, the PIN 220 may be inputted via the keypad. Using a microprocessor embedded in the debit card, the PIN may be verified and the debit card may be activated for use in a transaction.

At 206, the display may prompt input of a transaction amount shown at 214. At 208, a transaction amount of 10000 is displayed at 216.

Following the authentication of the pin number, when a second SVSC is positioned in as close proximity as approximately 4 inches to the debit card 200, a transaction of a payment of $10000 may be completed and transferred from SVSC 200 to the second SVSC.

Figure 3:
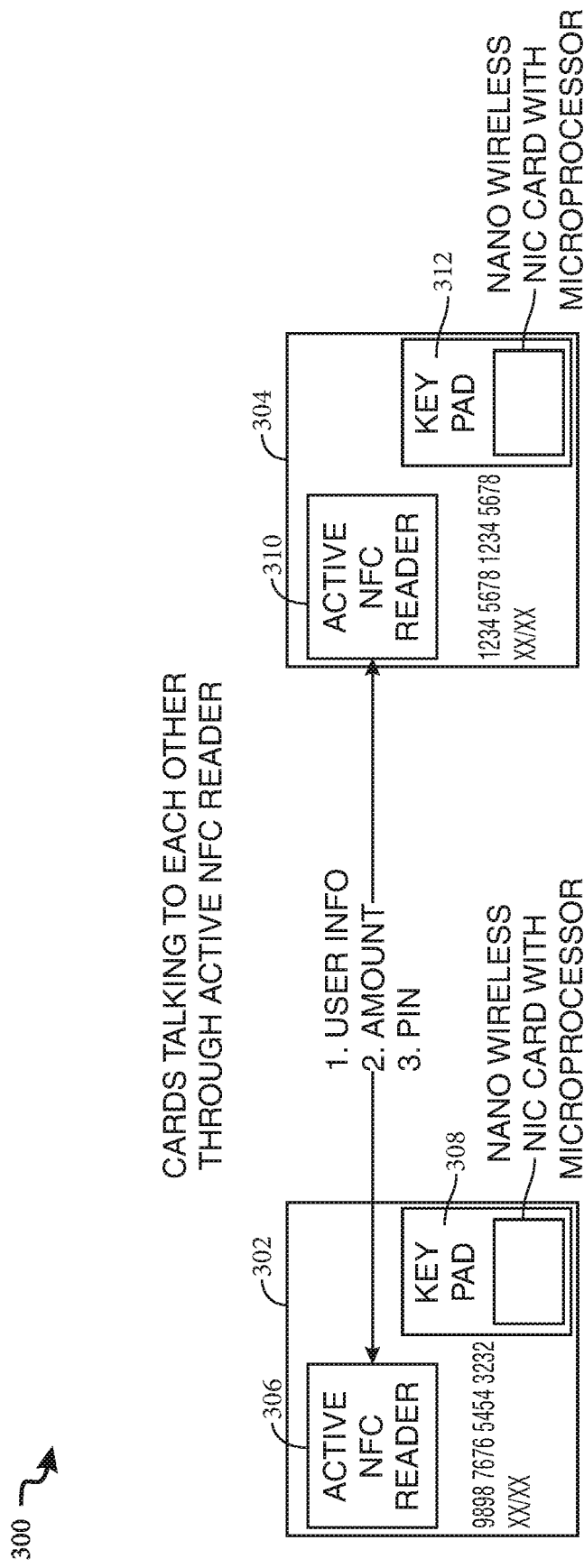
FIG. 3 shows an exemplary diagram in accordance with principles of the disclosure.

FIG. 3 shows an illustrative diagram 300 of two SVSCs directly communicating with one another in order to complete a transaction. In one exemplary embodiment, SVSC 302 may be the initiator and SVSC 304 may be the target. In another exemplary embodiment, SVSC 304 may be the initiator and SVSC 302 may be the target.

SVSC 302 may be a smart card that includes an active NFC reader 306. SVSC 302 may also include a keypad 308. SVSC 302, in this example, may be enabled to communicate with a second SVSC 304 in order to perform a transaction. SVSC 304 may also include an active NFC reader 310 and a keypad 312.

Each of SVSCs 302 and 304 may include a nano wireless NIC. The SVSC may also include a microprocessor.

SVSCs 302 and 304 may require input of a PIN into the keypad in order to activate the card to communicate with the other card and perform a transaction. When activated, the cards may be enabled to communicate with each other using the active NFC reader embedded in the card. Card ID data including user information, a transaction amount and in some embodiments, a PIN number, may be exchanged between SVSCs 302 and 304 using the active NFC reader.

When SVSC 302 is the initiator, SVSC 302 may complete the transaction directly with SV card 304. For example, SVSC 302 may have a monetary value of $100. SVSC 304 may have a monetary value of $75. A cardholder of the SVSC 302 may wish to transfer money to cardholder of SVSC 304. The amount of money may be $50. When SVSC 302 and SVSC 304 are in an NFC enabled range, cardholder of SVSC 302 may input the amount of $50 into SVSC 302 keypad. The amount may be captured and retrieved by the SVSC 304 and the value stored on SVSC 302 may be decreased by $50 and the value stored on SVSC 304 may be increased by $50.

When SV card 304 is the initiator, SV card 304 may complete the transaction directly with SV card 302.

Figure 4:
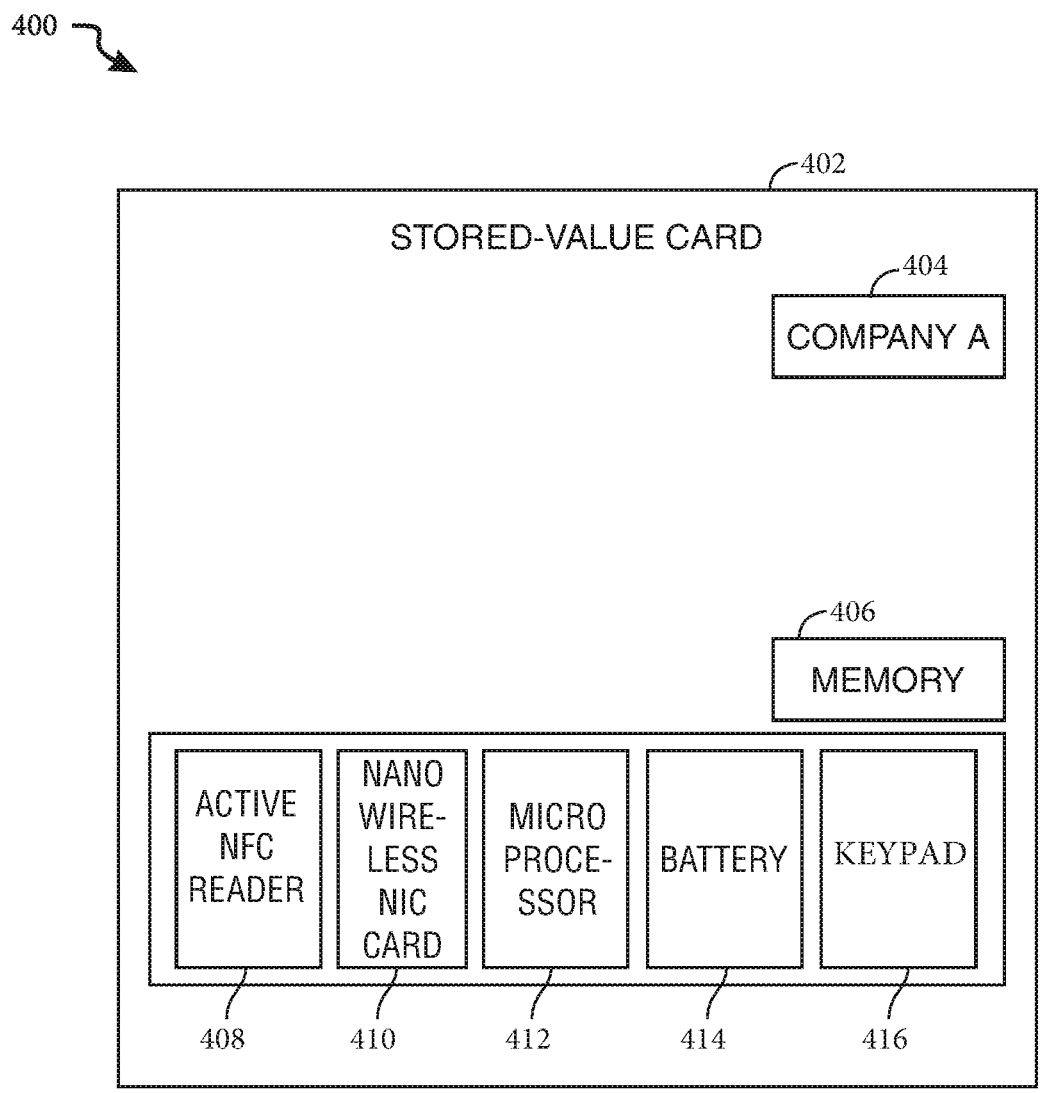
FIG. 4 shows an illustrative architecture in accordance with principles of the disclosure.

FIG. 4 shows an architecture 400 of an SVSC 402 that includes an embedded active NFC reader in accordance with principles of the disclosure. SVSC 402 may be configured to directly communicate with a second active SVSC (not shown.) SVSC 416 may include both NFC hardware and software to enable the smart card to perform as an active NFC device.

SVSC 402 may include an active NFC reader 408. SVSC 402 may also include a nano wireless NIC 410 and a microprocessor 412. SVSC 402 may also include a battery 414. SVSC 402 may also include a keypad 416. SVSC 402 may also include an NFC tag. The NFC tag and additional memory 406 that may be enabled to store data associated with the SVSC and the cardholder of the SVSC.

SVSC 402 may perform a transaction with another SVSC. NFC capabilities may enable the cardholder to activate NFC communication on the SVSC 402. The active NFC reader 418 may include a controller that may capture the amount of the transaction and the PIN that may be inputted into the keypad 416. The NFC reader may be enabled to be active using power supplied by the battery 414.

The cardholder may then be able to send and receive payment and authentication data to another SVSC. The cardholder may authenticate himself as the cardholder by input of a PIN. Upon authentication, the cardholder of the recipient of the transaction may capture the PIN and a transaction amount.

The active NFC reader 418 may be configured to activate NFC communication. The activation of the NFC communication may enable sending and receiving user payment and authentication data from one SVSC to another SVSC.

Figure 5:
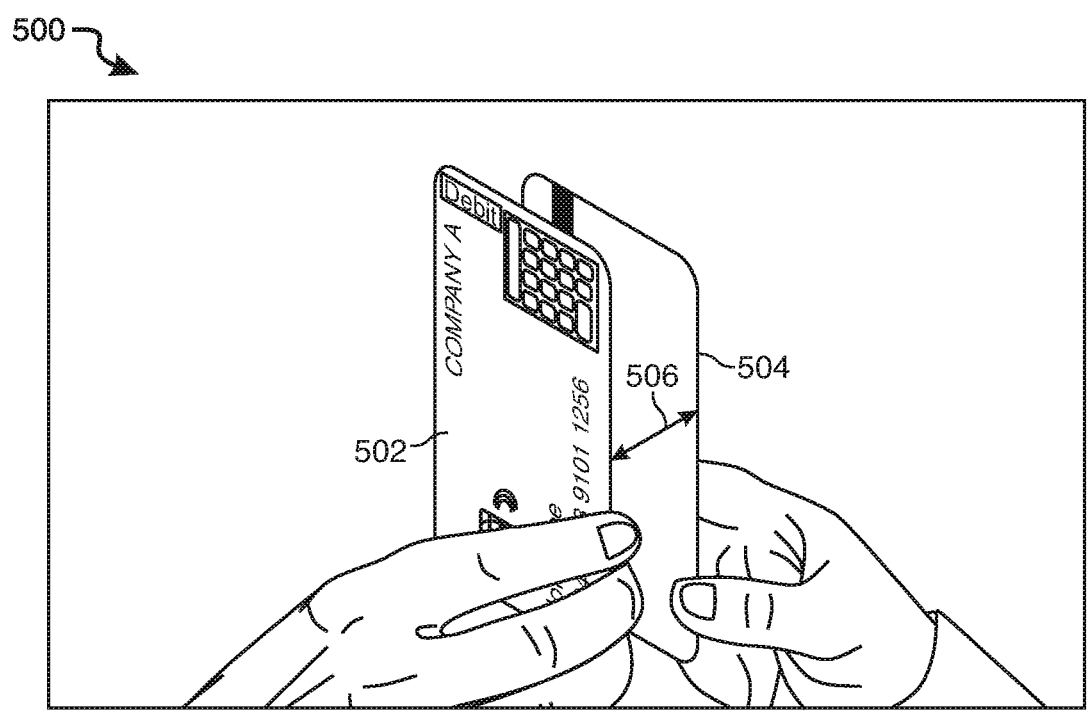
FIG. 5 shows an illustrative diagram in accordance with principles of the invention.

FIG. 5 shows an illustrative diagram 500 of a card-to-card direct communication. A cardholder of the first active SVSC may position his card in a first position as shown at 502. The cardholder of the second active SVSC may position his card in a second position, as shown at 504. The two positions may be within close proximity of each other. In order to perform a transaction and enable a two-way communication between the two cards, the distance between the two cards may be a distance ranging between zero and up to approximately 10 cm, as shown at 506. It should be appreciated that exemplary NFC communication ranges may be 0-1 inches, 0-1.5 inches, 0-2 inches, 0-2.5 inches, 0-3 inches, 0-3.5 inches, 0-4 inches, 0-4.5 inches, 0-5 inches, or any other suitable range supported by NFC apparatus.

Figure 6:
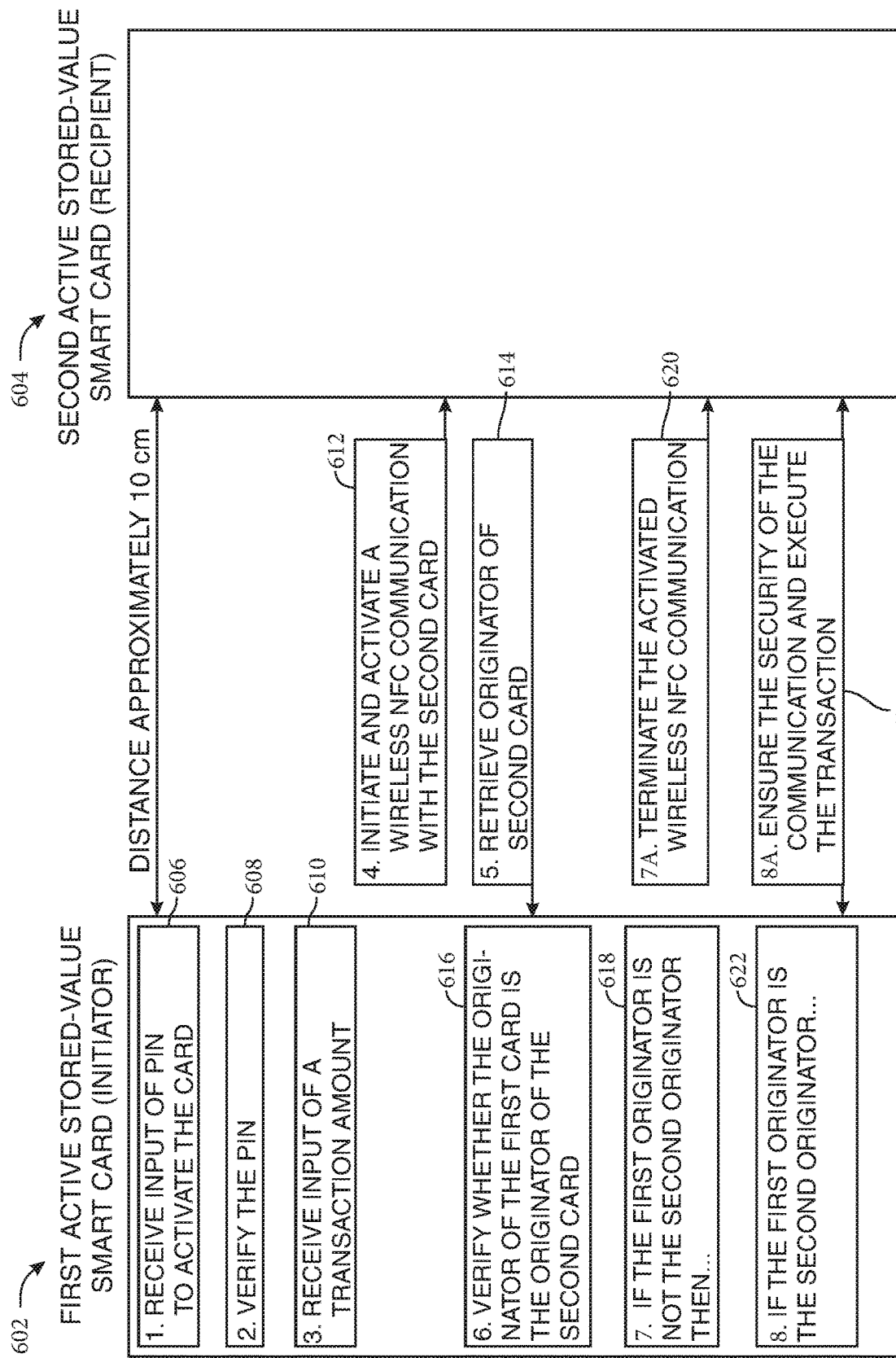
FIG. 6 shows an illustrative flowchart in accordance with principles of the invention.

FIG. 6 shows an illustrative flowchart 600 of a wireless communication between a first active SVSC 602 and a second active SVSC 604. The wireless communication may be leveraged to execute a transaction.

At step 1 (606), a cardholder of the first active SVSC 602 may input a PIN into the keypad of the card. The PIN may enable activating the card for use in performing a transaction. The first active SVSC 602 may verify the PIN, as shown at step 2 (608). The verifying may include comparing the inputted PIN to a pre-determined PIN stored on the first active SVSC 602. If the PIN cannot be verified, the cardholder may not be enabled to activate the card for use.

Following verification of the PIN, the first active SVSC 602 may receive input of a transaction amount, as shown at step 3 (610).

At step 4 (612), first active SVSC may initiate and active a wireless NFC communication with the second active SVSC 604.

Prior to performing a transaction between the two active SVSCs, the first active SVSC 602 may need to confirm that the originator of the first active SVSC is the originator of the second active SVSC.

At step 5 (614), the first active SVSC 602 may retrieve the originator associated with the second SVSC 604. At step 6 (616), the first active SVSC may verify whether the originator of the first active SVSC is the originator of the second active SVSC. At step 7 (618), if the first originator is not the second originator then step 7A (620) may be performed. The first active SVSC 602 may terminate the activated wireless NFC communication. When the first originator is the second originator, as shown at step 8 (622), the two active SVSCs 602 and 604 may communicate and complete the transaction, as shown at 8A (624.)

Included in step 8A, which may be prior to a completion of the transaction, first active SVSC 602 may ensure a security of the communication. The security of the communication may be ensured by acknowledging and confirming card ID data associated with the second active SVSC 604 and the second active SVSC 604 may acknowledge and confirm card ID data associated with the first active SVSC 602.

First active SVSC 602 may instruct second active SVSC 604 to release card ID data. The instructing may be enabled using NFC technology embedded in the card. When the first and second active SVSCs are within the range enabling NFC communication, the first active SVSC 602 may be enabled to retrieve card ID data associated with the second active SVSC 604.

The first active SVSC 602 may confirm the card ID data of the second active SVSC 604. The card ID data may include non-sensitive identifying data, i.e.—cardholder name, address, account number. The card ID data of the second active SVSC may be confirmed by comparing card ID data to data stored in a list of the first active SVSC 602. The card ID data may also be confirmed by reaching out to the payment network for validation. The card ID data may also be confirmed by a manual authentication. When the two active SVSCs are within NFC enabled range, card ID data associated with the second active SVSC may be displayed on the display of the first active smart card. The first active SVSC may be enabled, such that a cardholder can confirm that the card ID data of the second active SVSC is accurate and confirm execution of the transaction.

Following confirmation of the accuracy of the second active SVSC 604, the first active SVSC 602 may acknowledge confirmation. The second active SVSC 604 may then instruct the first active SVSC 602 to release card ID data. Second active SVSC 604 may retrieve card ID data associated with the first active smart card 602. Second active SVSC 604 may confirm the card ID data of the first active smart card 602. The second active SVSC 604 may acknowledge confirmation of the card ID data associated with the first active SVSC 602.

This may be performed as an added layer of security. The acknowledging may confirm that the appropriate cards are being used in performing the transaction. These steps may be considered a 'handshake', i.e.—an automated process of negotiation between the two communicating smart cards through the exchange of information that establishes the protocols of a communication link at the start of the communication, before full communication begins. This handshake may be between the first active SVSC 602 and the second active SVSC 604.

Once the card ID data is confirmed to be accurate, the transaction may be completed directly between the first active SVSC 602 and the second active SVSC 604.

Thus, methods and apparatus for performing a stored-value card-to-card direct contactless transaction is provided. Persons skilled in the art will appreciate that the present invention can be practiced by other than the described embodiments, which are presented for purposes of illustration rather than of limitation, and that the present invention is limited only by the claims that follow.

What is claimed is:

1. A method for performing a card-to-card direct contactless transaction between a first active stored-value smart card ("SVSC") and a second active SVSC, the first active SVSC associated with a first originator and the second active SVSC associated with a second originator, the method comprising:
    maintaining a keypad located on the first active SVSC in a deactivated state;
    activating the keypad located on the first active SVSC in response to receiving input of one or more numerical keys on the keypad located on the first active SVSC, the one or more numerical keys being equal to a one or more pre-determined numerical keys;
    activating the first active SVSC in order to perform a transaction with the second active SVSC, each of the first active SVSC and the second active SVSC comprising an active near-field communication ("NFC") reader, the activating comprising:
        receiving input of a personal identification number ("PIN") on the keypad located on the first active SVSC; and
        verifying, by a microprocessor embedded in the first active SVSC, the PIN being associated with the first active SVSC;
    receiving, on the keypad located on the first active SVSC, input of a transaction amount and storing the transaction amount on the first active SVSC;
    initiating a wireless NFC communication to perform the transaction between the first active SVSC and the second active SVSC, the initiating comprising positioning the first active SVSC within a pre-determined distance to a second active SVSC, the first active SVSC being an initiator of a transaction, the second active SVSC being the target of the transaction;
    verifying, by the microprocessor on the first active SVSC, that the first originator is the second originator, wherein when the first originator is not the second originator, the method comprises terminating the wireless NFC communication, and when the first originator is the second originator, the method comprises:
    ensuring a security of the wireless communication between the first active SVSC and the second active SVSC by performing, between the first active SVSC and the second active SVSC, a plurality of steps comprising:
        retrieving, via the active NFC reader associated with the first active SVSC, card ID data associated with the second active SVSC wherein the card ID data associated with the second active SVSC includes a name of a cardholder associated with the second active SVSC;
        acknowledging and confirming the card ID data associated with the second active SVSC by a microprocessor embedded in the first active smart card SVSC, wherein acknowledging and confirming the card ID data associated with the second active SVSC comprises:
            displaying the name of the cardholder associated with the second active SVSC on the display of the first active SVSC; and
            receiving, via the keypad located on the first active SVSC, authentication of the cardholder associated with the second active SVSC from a cardholder of the first active SVSC;
        retrieving, by the active NFC reader associated with the second active SVSC, card ID data associated with the first active SVSC and the transaction amount, from the first active SVSC, wherein the card ID data associated with the first active SVSC includes a name of the cardholder associated with the first active SVSC;
        acknowledging and confirming the card ID data associated with the first active SVSC by a microprocessor embedded in the second active SVSC, wherein acknowledging and confirming the card ID data associated with the first active SVSC comprises:
            displaying the name of the cardholder associated with the first active SVSC on the display of the second active SVSC; and
            receiving, via the keypad located on the second active SVSC, authentication of the cardholder associated with the first active SVSC from the cardholder of the second active SVSC; and
    in response to the acknowledging, completing the transaction between the first active SVSC and the second active SVSC by reducing, by the transaction amount, a value stored on the first active SVSC and increasing, by the transaction amount, a value stored on the second active SVSC.

2. The method of claim 1 wherein the increasing further comprises increasing by the transaction amount less a transaction fee.

3. The method of claim 1 wherein the first and second active SVSC are a closed-loop type stored value card enabling funds and data to he physically stored on the card.

4. The method of claim 1 wherein the pre-determined distance of the positioning comprises positioning the first active SVSC equal to or less than a distance of four inches from the second active SVSC.

5. The method of claim 1 wherein the wireless communication between the first active SVSC and the second active SVSC is a peer-to-peer ("P2P") mode of communication.

6. The method of claim 5 wherein the P2P mode of communication comprises a two-way communication channel between the first active SVSC and the second active SVSC wherein:
    when the card ID data from the first active SVSC is being retrieved by the second active SVSC, the active NFC reader in the first active SVSC is in a passive state and the active NFC reader in the second active SVSC, reading and processing the card ID data, is in an active state; and
    when the card ID data from the second active SVSC is being retrieved by the first active SVSC, the active NFC reader in the second active SVSC is in a passive state and the active NFC reader in the first active SVSC, reading and processing the card ID data is in the active state.

7. The method of claim 1 wherein the acknowledging and confirming further comprises:
    for the first active SVSC, comparing the card ID data to a list of card ID data stored on the first active SVSC and verifying that the card ID data is included in the stored list; and
    for the second active SVSC, comparing the card ID data to a list of card ID data stored on the second active SVSC and verifying the card ID data is included in the stored list.

8. The method of claim 1 wherein prior to the activating of the first active SVSC, the active NFC reader is powered-off.

9. The method of claim 1 wherein following the retrieving of the card ID data from the first active SVSC to the second active SVSC, the method further comprises activating the second active SVSC by receiving input of a PEN associated with the second active SVSC and verifying the PIN being associated with the second active SVSC.

10. The method of claim 1 wherein following the completing of the transaction, the method further comprises:
    receiving, via the active NFC reader on the second active SVSC, a confirmation from the first active SVSC of the completing of the transaction;
    transmitting the confirmation from the microprocessor embedded in the second active SVSC to the display on the second active SVSC, via a display connector; and
    displaying, on the display of the second active SVSC, a message confirming a completion of the transaction.

\* \* \* \* \*